United States Patent
Inoue et al.

(10) Patent No.: US 7,696,469 B2
(45) Date of Patent: Apr. 13, 2010

(54) SAFETY MULTI-OPTICAL AXIS PHOTOELECTRIC SENSOR

(75) Inventors: Tetsu Inoue, Osaka (JP); Koji Fukumura, Osaka (JP)

(73) Assignee: Keyence Corporation, Osaka (JP)

(*) Notice: Subject to any disclaimer, the term of this patent is extended or adjusted under 35 U.S.C. 154(b) by 109 days.

(21) Appl. No.: 12/018,283

(22) Filed: Jan. 23, 2008

(65) Prior Publication Data
US 2008/0179504 A1    Jul. 31, 2008

(30) Foreign Application Priority Data
Jan. 25, 2007    (JP)    ............... 2007-015148

(51) Int. Cl.
G06M 7/00    (2006.01)
G01N 21/86    (2006.01)
(52) U.S. Cl. .................... 250/221; 250/559.12
(58) Field of Classification Search ......... 250/221, 250/559.12, 559.13, 222.1, 559.4; 340/540, 340/541, 545.1, 545.3, 552–557, 679, 507, 340/506; 72/21.3, 14.3; 361/170, 173–177; 192/116.5, 129 R, 130, 129 A, 146, 144
See application file for complete search history.

(56) References Cited

U.S. PATENT DOCUMENTS

| 5,302,942 | A | | 4/1994 | Blau | |
|---|---|---|---|---|---|
| 5,880,954 | A | * | 3/1999 | Thomson et al. | ............... 700/79 |
| 6,414,603 | B1 | * | 7/2002 | Yamaguchi et al. | ...... 340/815.4 |
| 6,979,814 | B2 | * | 12/2005 | Kudo et al. | ............... 250/221 |
| 7,122,782 | B2 | | 10/2006 | Sakaguchi | |
| 2003/0052254 | A1 | | 3/2003 | Kudo et al. | |
| 2003/0146373 | A1 | | 8/2003 | Kudo et al. | |
| 2003/0164447 | A1 | | 9/2003 | Kudo et al. | |
| 2005/0063114 | A1 | | 3/2005 | Suhara et al. | |

FOREIGN PATENT DOCUMENTS

JP    11345548    12/1999
JP    2003-218679    7/2003

OTHER PUBLICATIONS

U.S. Appl. No. 12/018,839, filed Jan. 25, 2008, Inoue et al.

* cited by examiner

*Primary Examiner*—Que T Le
*Assistant Examiner*—Pascal M Bui-Pho
(74) *Attorney, Agent, or Firm*—Kilyk & Bowersox, P.L.L.C.

(57) ABSTRACT

The present invention can be used in a multi-optical axis photoelectric sensor indicating an operating status thereof to a non-safety control device. The present invention allows the multi-optical axis photoelectric sensor so as to become a easier operation. The multi-optical axis photoelectric sensor has a control unit to providing a safety control signal representing a result of a distinguish portion in a normal operating status, a safety control signal representing operation non-allowable in an abnormal status and a safety control signal representing operation allowable in a special operating status. The multi-optical axis photoelectric sensor also has an operating status indication portion for determining an operating status of the multi-optical axis photoelectric sensor from the normal operating status, the abnormal status and the special operating status, and providing the operating status to an external device via the same output line regardless of the result of the determination.

10 Claims, 8 Drawing Sheets

SAFETY MULTI-OPTICAL AXIS PHOTOELECTRIC SENSOR

CROSS-REFERENCE TO RELATED APPLICATION

The present application claims priority from Japanese Patent Application No. 2007-015148, filed on Jan. 25, 2007, the entire contents of which are hereby incorporated by reference.

BACKGROUND OF THE INVENTION

1. Field of the Invention

The present invention relates to a multi-optical axis photoelectric sensor forming a light curtain for detecting a human body and the like penetrating into a predetermined area. In more detail, the present invention relates to an output of the multi-optical axis photoelectric sensor provided for a non-safety control device.

2. Description of the Related Art

In general cases, a multi-optical axis photoelectric sensor for detecting a human body and the like, is utilized where a person can come in contact with a hazardous source, thereby providing safety to the person in view of a machine which is assessed as the hazardous source such as a press machine. The multi-optical axis photoelectric sensor includes: an emitting unit having a plurality of emitting elements arranged in a line; and a receiving unit having a plurality of receiving elements which receive light beams from the plurality of emitting elements and arranged in a line. A light curtain is formed by a plurality of light beams between the emitting unit and the receiving unit, to separate the hazardous source from the other area. In case where an object penetrates into the light curtain, the multi-optical axis photoelectric sensor detects that the light beam is intercepted (blocked). In this case, the multi-optical axis photoelectric sensor outputs a cutout signal for cutting out a power supply to a motor and the like which drives the hazardous source.

The multi-optical axis photoelectric sensor including various kinds of special functions has been developed. This is shown, for example, in Japanese published patent No. 2003-218679. The special functions are, for example, a muting function, an override function etc. as described below.

The "Muting function" is a function to temporarily disable the detection function of the multi-optical axis photoelectric sensor in response to a signal received ("muting signal", hereinafter) from an external muting sensor. When the muting function is activated, the multi-optical axis photoelectric sensor temporarily provides a safety control signal representing an operation allowable even if the light beam is blocked. In detail, the safety control signal representing the operation allowable is ON state signal.

A photoelectric sensor and a limit switch are suitable for the muting sensor. A status of the multi-optical axis photoelectric sensor is shifted to a status in which the muting function is activated ("muting status", hereinafter) when a condition regarding the multi-optical axis photoelectric sensor meets the requirement that all of the light beams of the multi-optical axis photoelectric sensor pass through in a normal mode (normal operating status), namely the safety control signal is ON state, and the muting signal is received. On the other hand, when the condition regarding the multi-optical axis photoelectric sensor does not meet the requirement, for example, a) one of any light beams is intercepted in the normal mode, namely the safety control signal is OFF state or b) an abnormal status is detected by a self check function of the multi-optical axis photoelectric sensor, a shifting into the muting status is not performed even if the muting signal is received.

The multi-optical axis photoelectric sensor has the self check function for watching fault itself, an abnormal condition from external noises etc. all the time. In case where at least one fault and some abnormal condition is detected by the self check function, a safety control signal representing an operation non-allowable is provided even if all of the light beams for detecting the object are passed through. In some cases, a product line is suspended when a product machine is cut off based on the safety control signal representing an operation non-allowable signal. In such a case, productivity may decrease. On the other hand, the multi-optical axis photoelectric sensor outputs the safety control signal representing an operation non-allowable signal in accordance with an improper user's operation for setting an additional function such as the muting function since the multi-optical axis photoelectric sensor is developed under the fail safe concept.

Referring to FIG. 5, an example of system installing the muting function will be described.

Figure 5A:
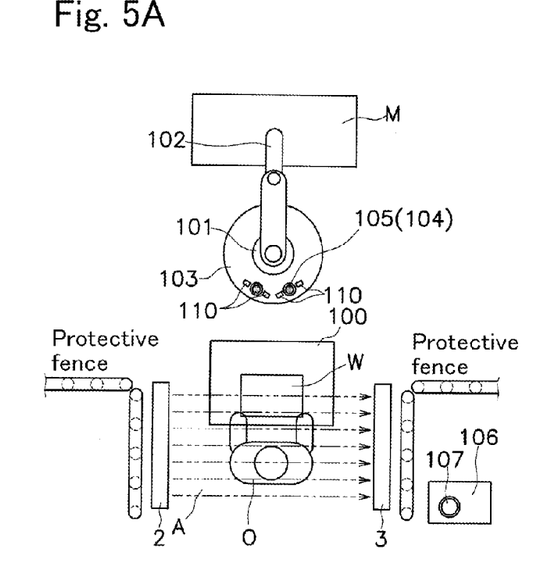
FIG. 5A is a schematic plan view showing another example of operation for a system with a multi-optical axis photoelectric sensor.

In FIG. 5A, a robot 101 and a processing machine M are disposed in an area surrounded by protective fences. The protective fences have an opening for a path passed by an operator O who carries an object W into the area. The emitting unit 2 and the receiving unit 3 are placed in front of the opening. Consequently, the light curtain, namely a detection area A, is formed corresponding to the opening in order to detect the operator O existing at the opening of the protective fences.

Figure 5B:
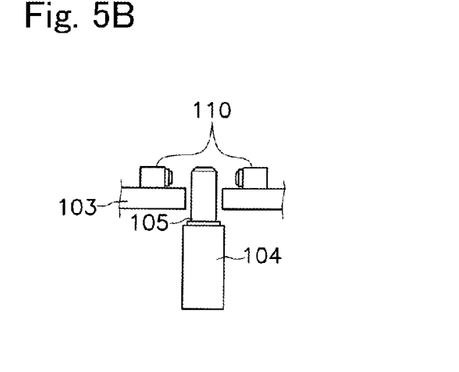
FIG. 5B is a schematic side view showing a mechanical lock mechanism.

As shown in FIG. 5B, a rotating motion of an arm 102 is locked by a rod 105 of a cylinder 104 when the emitting unit 2 and the receiving unit 3 of the multi-optical axis photoelectric sensor does not detect an operator O penetrating into the detection area A. Then, the lock status is detected by, for example, an optical sensor 110. The optical sensor 110 is connected to a muting input terminal of the multi-optical axis photoelectric sensor. Thus, the status of the multi-optical axis photoelectric sensor is shifted to muting status based on the muting signal from the optical sensor 110. Consequently, the operator O is permitted to enter the detection area A to carry the object W on a rest 100.

The robot 101 rotates the arm 102, and provides the object W disposed on the rest 100 in an operation area, and the robot 101 carries it to a processing machine M. The robot 101 is able to rotate only when the rod 105 of the cylinder 104 equipped at a rotating unit 103 as shown in FIG. 5D is located downwardly. The robot 101 is not allowed to rotate in the case of FIG. 5B. Therefore, safety for the operator O in the detection area A is secured although the operator O is located in the detection area A.

Figure 5C:
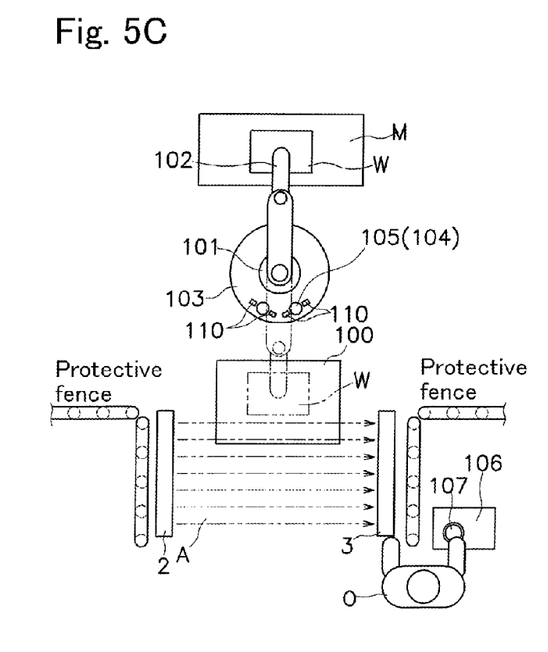
FIG. 5C is a schematic plan view showing another example of operation for a system with a multi-optical axis photoelectric sensor.
Figure 5D:
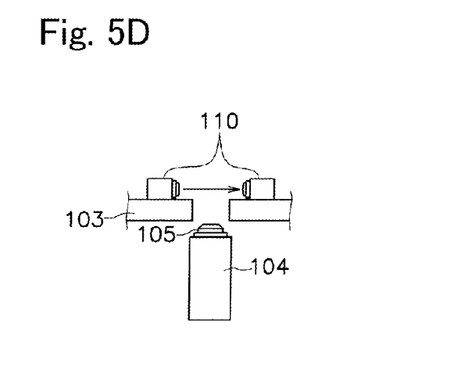
FIG. 5D is a schematic side view showing a mechanical lock mechanism.

In case of restarting of the robot 101 to operate, as shown in FIG. 5C, the operator O goes out from the detection area A and pushes a start button 107 of an operational panel 106. Consequently, the rod 105 moves downwardly as shown in FIG. 5D. Therefore, the muting status is canceled since a requirement for maintaining the muting status is not met based on passing through of the optical sensor 110. In this case, the arm 102 shown in FIG. 5C rotates and puts the object W on the rest 100.

However, for example, in case where the operator O does not exit from the detection area A completely and reaches for the start button 107, a careless stop occurs in that part of the industrial system since the muting status is canceled and the light beam is stilt intercepted by the operator O.

When the multi-optical axis photoelectric sensor detects the object on the light curtain, the safety control signal becomes OFF state. This status is an interlock status. There are two ways to return from the interlock status to the normal operating status.

One way is to automatically reset; that is, a requirement for returning to the normal operating status is that all light beams passed through.

The other way is to manually reset; that is, a requirement for returning to the normal operating status is not only that all light beam are passed through, but also that an interlock reset signal is provided. In the case of an interlock by manually reset, an operator pushes an interlock reset button to reset the interlock of the multi-optical axis photoelectric sensor. However, the operator can not know whether the multi-optical axis photoelectric sensor has been prepared for receiving the interlock reset signal or not. The operator does not know whether the interlock was reset or not, either.

To control the multi-optical axis photoelectric sensor via a non-safety controller, such as a PLC (Programmable Logic Controller) may solve these problems, but safety regulations may not permit one to control the safety component via a non-safety controller. Thus, these problems still remain.

SUMMARY OF THE INVENTION

The present invention solves such drawbacks of the conventional technique. An object of the present invention is to provide a multi-optical axis photoelectric sensor capable of reducing waiting time for completely changing the status of the multi-optical axis photoelectric sensor and to prevent mistaken operation for an operator and to secure safety.

According to the present invention, the above technical problem can be solved by providing a multi-optical axis photoelectric sensor that includes a plurality of light axes to provide a safety control signal corresponding to light pass/block status of the plurality of light axes, having a distinguish portion for distinguishing whether all of the plurality of light axes are passed through or at least one of the plurality of light axes is blocked; a detector to detect an abnormal condition of the multi-optical axis photoelectric sensor; a control unit to control the safety control signal based on the result distinguished by the distinguish portion and the result detected by the detector, wherein the control unit sets the safety control signal representing the result distinguished by the distinguish portion on a normal operating status, the control unit sets the safety control signal representing that at least one of the plurality of light axes is blocked regardless of the result distinguished by the distinguish portion on an abnormal status detected by the detector, and the control unit sets the safety control signal representing all of the plurality of light axes are passed through regardless of the result distinguished by the distinguish portion on a special operating status; and an operating status indicating portion for determining an operating status of the multi-optical axis photoelectric sensor from the normal operating status, the abnormal status and the special operating status and for indicating the determined operating status of the multi-optical axis photoelectric sensor to an external device via the same output line regardless of the determined operating status.

According to the present invention, the operating status indicating portion may indicate a shifting of the operating status.

According to the present invention, the same output line may include a plurality of individual lines, and the operating status indicating portion may provide a first signal having pulses of the number corresponding to the operating status via one of the plurality of individual lines and a second signal representing whether the first signal is enabled or not via another of the plurality of individual lines.

According to the present invention, the same output line may include a plurality of individual lines, and the operating status indicating portion may provide binary code made by a combination of a plurality of ON/OFF state signals via each of the plurality of individual lines.

According to the present invention, the control unit may be controlled so as to shift the multi-optical axis photoelectric sensor to a muting status as the special operating status based on receiving a muting input.

According to the present invention, the control unit may be controlled so as to shift the multi-optical axis photoelectric sensor to a muting status as the special operating status based on receiving a muting input in only case where the distinguish portion distinguishes that all of the plurality of light axes are passed through.

According to the present invention, the control unit may be controlled so as to shift the multi-optical axis photoelectric sensor to an override status as the special operating status based on receiving a muting input and an override input.

According to the present invention, the control unit may be controlled so as to shift the multi-optical axis photoelectric sensor to an override status as the special operating status based on receiving a muting input and an override input in the case where the distinguish portion distinguishes that at least one of the plurality of light axes is blocked.

According to the present invention, the operating status indicating portion may not indicate the operating status of the multi-optical axis photoelectric sensor or may indicate an unidentified operating status until verification of shifting the operating status at the power "on" period.

According to the present invention, the operating status indicating portion may not indicate the operating status of the multi-optical axis photoelectric sensor or may indicate unidentified operating status until verification of shifting the operating status at the shifting period.

With a multi-optical axis photoelectric sensor according to the present invention, an operator and the like are safely secured since a safety control output is received by a safety control device. Moreover, information about an operating status of the multi-optical axis photoelectric sensor is provided from an operating status indicating means, and is received by a non-safety control device. The non-safety control device has no obligation related to the safety regulations. Thus, the non-safety control device is capable of controlling in various ways. For example, the multi-optical axis photoelectric sensor is capable of providing information indicating whether the multi-optical axis photoelectric sensor is preparing for resetting an interlock or not. Further, the number of output lines can be restrained to increase the number of output lines since the information regarding the operating status indicated to an external device can be sent via the same line as each operating status.

The "normal operating status" is a status defined by the state of the safety control signal that turns ON/OFF (representing operation allowable/operation non-allowable or stop signal) in accordance with the condition whether the light beam of the multi-optical axis photoelectric sensor is passed through or intercepted. In more detail, the state of the safety control signal turns ON/OFF in response to a status whether all of the light beams of the multi-optical axis photoelectric sensor are passed through or at least one of any light beams of the multi-optical axis photoelectric sensor is intercepted in the normal operating status.

The "abnormal status such as emitting error, receiving error, communicating error, connecting configuration error, output error and muting lamp fault" is a status defined by a state of the safety control signal maintained in OFF state (representing operating non-allowable or stop) regardless of the condition whether the light beam of the multi-optical axis photoelectric sensor is passed through or intercepted. When an error or fault is detected, the multi-optical axis photoelectric sensor is shifted to the "abnormal status". There are various causes for error and fault. One of preferred embodiments is to indicate each status of the multi-optical axis photoelectric sensor corresponding to each cause. Another preferred embodiment is to indicate the "abnormal status" regardless of the causes. To shift the "abnormal status" to the "normal operating status" is performed in response to the same manner as in the "interlock". That is, in the case where all of the light beams are passed through, the multi-optical axis photoelectric sensor is allowed to shift to the "normal operating status" in response to receiving the reset input. On the other hand, in the case where one of any light beams is intercepted, the multi-optical axis photoelectric sensor is allowed to shift to the "normal operating status" regardless of receiving the reset input.

As one of the preferred embodiments, a multi-optical axis photoelectric sensor has a muting lamp port for directly connecting to a muting lamp. The muting lamp port does not only provide current for the connected muting lamp, but is also connected to a detecting circuit for inspecting the current passing into the lamp. When the current passed into the lamp is not normal, the status is determined as the abnormal status since the muting function is temporarily disabled from at least a part of the function of the multi-optical axis photoelectric sensor, and the multi-optical axis photoelectric sensor is capable of connecting to an external muting lamp to indicate the status easily. Accordingly, to indicate that the muting lamp is not in a proper status is important.

DETAILED DESCRIPTION OF THE PREFERRED EMBODIMENTS

In the present invention, when an operating status indicating means is set to providing a signal at only a timing of shifting of the operating status, a few output wires are capable of providing each signal corresponding to various kinds of statuses since the signal is not required to output all the time.

In the present invention, the same output line includes a plurality of output individual wires. In this case, the operating status indicating means provides a signal representing an operating status of the multi-optical axis photoelectric sensor with the number of pulses of pulsed signal via one group of the plurality of wires, and indicates an enabled timing of the pulsed signal via another of the plurality of wires. Consequently, various kinds of status are indicated via two individual lines.

In the present invention, the same output line includes a plurality of output wires. The operating status indicating means may indicate the operating status with a binary code from combination of ON/OFF state of a plurality of wires.

In the present invention, a special operating status of the multi-optical axis photoelectric sensor may be a muting status in which a safety control signal representing operation allowable is temporarily provided in response to an external muting input regardless of the result of the determination by a distinguish means.

Further, as the present invention, a status of the multi-photoelectric sensor may be shifted from the normal operating status to the muting function activating status in the case where the distinguish means determines that all of the light beam 3 are passed through.

In the present invention, the special operating status may be an override status in which a safety control signal representing operation allowable is temporarily provided in response to an external muting input and an override input in case where the distinguish means determines that one of any light beams is blocked.

Further, as the present invention, a status of the multi-optical axis photoelectric sensor may be shifted from the normal operating status to the overriding status in the case where the distinguish means determines that one of any light beams is blocked and an external muting input is received.

As the present invention, after power on, the operating status indicating means may not indicate any signals representing operating status until confirming the operating status. Alternatively, after power on, the operating status indicating means may be indicated as an undefined status until confirming the operating status. As a result, in an initial period after power on, the operating status indicating means can be prevented from providing incorrect information although the operating status is undefined.

In the present invention, the operating status indicating means may not indicate any operating statuses at the shifting of the operating status until confirming the shifted operating status. Alternatively, after power on, the operating status indicating means may be indicated as an undefined status until confirming of the operating status. As a result, in a shifting period, the operating status indicating means can be prevented from providing incorrect information although the operating status is undefined.

First Embodiment

Multi-Optical Axis Photoelectric Sensor 1

Figure 1:
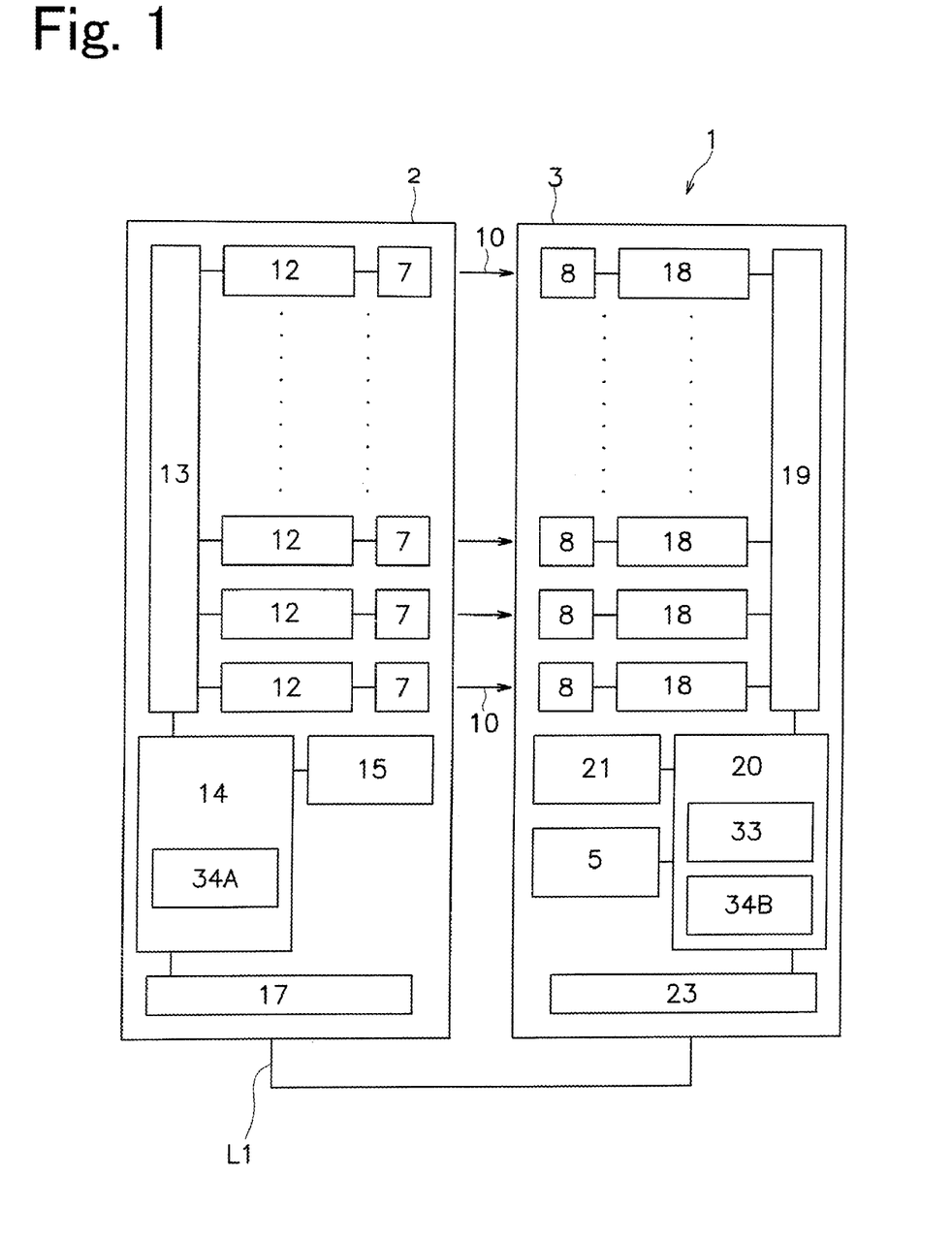
FIG. 1 is a schematic block diagram showing a multi-optical axis photoelectric sensor according to a first embodiment.

In FIG. 1, a multi-optical axis photoelectric sensor 1 of the present invention includes a pair of an emitting unit 2 and a receiving unit 3, and controller 5 is installed in the receiving unit 3. The controller 5 is connected to the emitting unit 2 via a communication line or a signal line L1.

The emitting unit 2 and the receiving unit 3 are arranged in a plane and faces to each other in a plane. A plurality of light beams such as infrared light beams are emitted from each of a plurality of emitting elements 7 of the emitting unit 2 to each of a plurality of receiving elements 8, corresponding to each of the plurality of emitting elements 7, of the receiving unit 3. Consequently, a safety light curtain is formed between the emitting unit 2 and the receiving unit 3. Reference number 10 as shown in FIG. 10 represents a light axis.

The emitting element 7 constitutes, for example, a light emitting diode (LED) emitting an infrared light. On the other hand, the receiving element 8 constitutes, for example, a photo diode. A condenser lens, not shown, is disposed in front of each of the plurality of the emitting elements 7 and the plurality of the receiving elements 8.

The emitting unit 2 includes the emitting element 7 of N unit, an emitting circuit 12 of N unit for driving the emitting element 7 of N unit respectively, an element switching circuit 13 for scanning the emitting element 7 of N unit with time-sharing, and an emitting control circuit 14 for controlling the emitting unit 2 as a whole. The emitting control circuit 14 receives a clock signal generated by a clock generating circuit 15. Then, the emitting control circuit 14 determines an emitting timing in response to the clock signal so that the emitting element of N unit emits corresponding to the emitting timing in turn.

The emitting unit 2 has a communication control circuit 17 for controlling communication with the controller 5 and the receiving unit 3 such as an interchange of a timing signal. The emitting control circuit 14 activates the emitting circuit 12 of N unit in turn in response to receiving an instruction from the controller 5. Then, the emitting elements 7 are controlled to emit in turn from first light axis 10 to N-th of the light axis 10. As a result, the emitting unit 2 emits the light beam in turn from the first light axis 10 to the light axis 10 of N-th to the receiving unit 3.

The receiving unit 3 includes the receiving unit 8 of N unit, a receiving circuit 18 of N unit for driving the receiving element 8 of N unit respectively, an element switching circuit 19 for scanning the receiving element 8 of N unit with time-sharing, and an receiving control unit 20 for controlling the receiving unit 3 as a whole. The receiving control unit 20 receives a clock signal generated by a clock generating circuit 21. Then, the receiving control unit 20 determines a receiving timing in response to the clock signal so that the receiving element of N unit activates to receive corresponding to the receiving timing in turn.

The receiving unit 3 has a communication control circuit 23 for controlling communication with the controller 5 and the emitting unit 2 such as an interchange of a timing signal. The receiving control unit 20 activates the receiving circuit 18 of N unit in turn in response to receiving an instruction from the controller 5. Then, the receiving elements 8 are controlled to receive in turn from first light axis 10 to N-th of the light axis 10. As the result, the receiving unit 3 receives the light beam in turn from the first light axis 10 to the light axis 10 of N-th to the receiving unit 3.

A receiving signal (representing each light axis is passed through or intercepted) from the receiving element 8 is provided to the receiving control unit 20 via the respective circuit of the receiving unit 3. In detail, a distinguish means 33 of the receiving control unit 20 distinguishes into binary statuses corresponding to a first status where all of the light axes 10 are passed through or a second status where at least one of any light axes 10 is intercepted, based on the output from the receiving element 8.

Figure 2A:
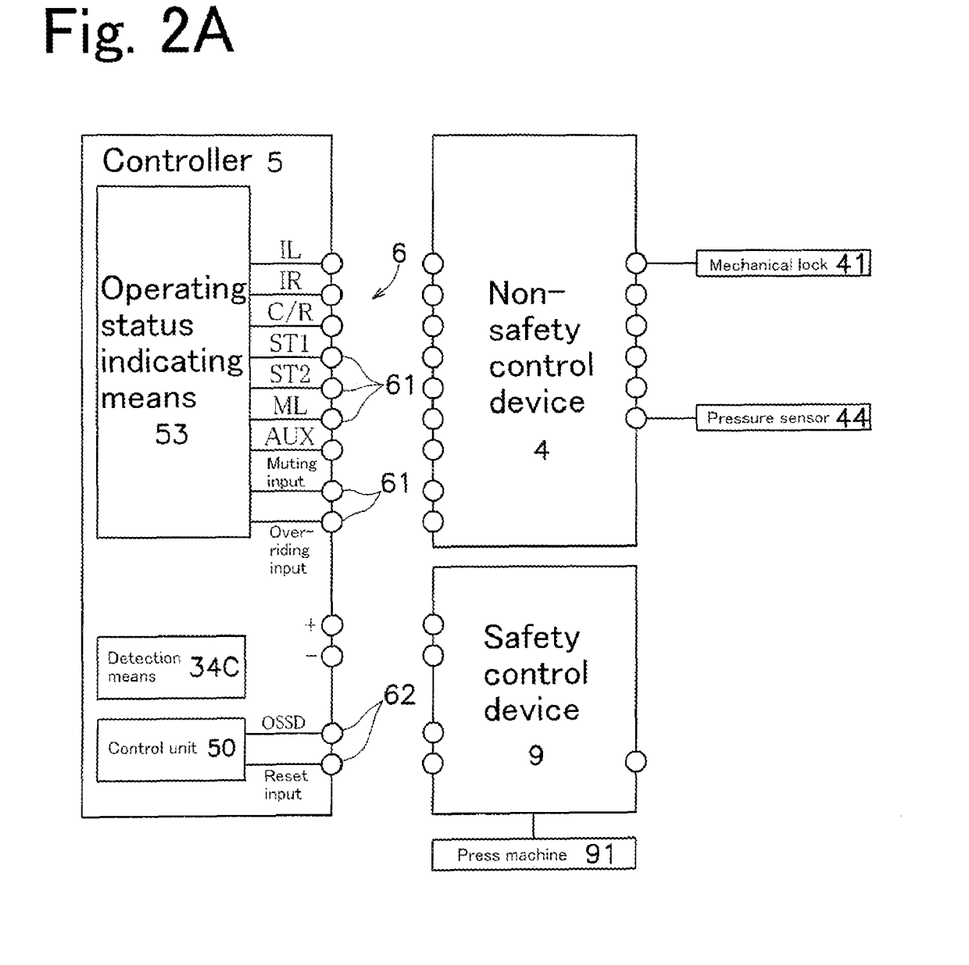
FIG. 2A is a schematic block diagram showing a controller, a non-safety control device and safety control device.

As shown in FIG. 2A, the controller 5 includes an operation indicating means 53, a detection means 34C and a control unit 50. The multi-optical axis photoelectric sensor 1 has various kinds of operating statuses described below. The operating status indicating means 53 has a function of checking a current operating status as described below.

The multi-optical axis photoelectric sensor 1 equips the emitting control circuit 14, the receiving control unit 20, the controller 5 (in FIG. 2A) and detection means 34A-34c in order to detect (self-check) a fault of the multi-optical axis photoelectric sensor 1 itself and any abnormal status caused by external noise. For example, the detection means 34B as shown in FIG. 1 detects that the receiving circuit 18 operates normally, that the element switching circuit 19 switches the receiving circuit 18 to activate only one receiving circuit 18 at the same time, and that the communication control circuit 23 and the output circuit operates normally. In more detail, for example, in the case of checking the output circuit, when the receiving unit 3 receives the light from the emitting unit 2, an ON state signal as an emitting enable signal is suspended (output OFF signal) in an extremely short time range and periodically. Then, the detection means 34B detects whether the output circuit can output the stop status or not. Consequently, a fault of a transistor or the like of the output circuit can be detected all the time. The detection means 34B checks fault of the multi-optical axis photoelectric sensor 1 all the time since such self-checking is repeatedly performed.

The self-checking method for detecting an abnormal status of a multi-optical axis photoelectric sensor 1 is well-known. As another method, a method to detect an abnormal status based on a result of the measurement of whether a predetermined current is passed or not at an emitting timing so as to determine whether any of two or more emitting elements of the emitting unit emit simultaneously, and a method for checking an external light noise based on a receiving status of a receiving element at a non-emitting timing, and the combination can be used.

The multi-optical axis photoelectric sensor 1 shown in FIG. 2A has a connector 6 including a plurality of terminals 61, 62 for connecting to a non-safety control device 4 and a safety control device 9 respectively. The non-safety control device 4 and the safety control device 9 are connected to the controller 5 respectively.

The safety control device 9 is generally designed such that a redundant circuit and self-checking function are equipped so that safety is secured even though a fault and an abnormality occurred. A safety control output such as an operation allowable and an operation non-allowable is output in accordance with an operating status as described following from a control unit 50 of the controller 5 to the safety control device 9 via the output terminal 62 (OSSD). On the other hand, a reset input is inputted from the process machine as the safety control device to the controller 5. The non-safety control device 4 is corresponding to, for example, a PLC, and various kinds of control devices are suitable to the non-safety control device 4. A muting input and an override input are inputted from the non-safety control device 4. An interlock mode select IL is an input line for choosing activation of a restart interlock function.

An operating status indicating means 53 is connected to an output line described below. A symbol "IR" represents an output line for outputting a signal at waiting for release restart interlock. A symbol "Warn" represents an output line for warning when the light amount is reduced corresponding to improper alignment of the light axis and/or dirt of the lens surface. A symbol "ST1" and a symbol "ST2" represent an output line for indicating a status (normal, abnormal, muting, override and interlock) of the multi-optical axis photoelectric sensor 1 to the non-safety control device 4. A symbol "C/R" represents an output line for outputting a status whether all of the light axes is passed through or at least one of any light axes is intercepted. The safety control output concerns not only the status of C/R, but also other statuses. So the safety control output does not always match the status of C/R. A symbol "ML" represents an output line for turning on a muting lamp. A symbol "AUX" represents a no-safety output corresponding to the safety control output.

Operating Status:

The multi-optical axis photoelectric sensor 1 is capable of being set to various kinds of operating status. The operating status includes a normal operating status, an abnormal status, special function status and the like.

Normal Operating Status;

In the normal operating status, a safety control output corresponding to passed through/intercepted status of the light axes 10 shown in FIG. 1 is outputted from the control unit 50.

In a first status where all of the light axes are passed through in a normal operating status, an all-light-passing signal is outputted from the distinguish means 33 shown in FIG. 1 to the controller 5. On the other hand, in a second status where at least one of any light axes is intercepted in a normal operating status, an intercepted signal is outputted from the distinguish means 33 shown in FIG. 1 to the controller 5. In the normal operating status, in response to the controller 5 receiving the intercepted signal, the control unit 50 outputs a safety control output representing operating non-allowable to the safety control device 9. In the normal operating status, in response to the controller 5 receiving the all-light-passing signal, the control unit 50 outputs a safety control output representing operating allowable to the safety control device 9.

In the operating status indicating means 53, for example, a respective program corresponding to each status exists. When a predetermined requirement is met during the running of a program corresponding to one status, the operating status indicating means 53 has a means for initiating a program for another status and a watching function for watching by determining a shift of the status based on an initiation of a program for another status.

In the Abnormal Status;

In the present system, the detection means 34A to 34C (shown in FIG. 1 and FIG. 2A) described above detects an abnormal status regarding a circuit and the like of the multi-optical axis photoelectric sensor 1. When the circuit and the like of the multi-optical axis photoelectric sensor 1 is detected as an abnormal status, the control unit 50 outputs a safety control output representing operation non-allowable to a safety control device 9 regardless of a signal representing the status of passed through or intercepted by the distinguish means 33 (shown in FIG. 1).

Special Status:

A function in the special status includes, for example, a muting function and an override function. In the special status, the control unit 50 outputs a safety control output representing operation allowable to a safety control device 9 regardless of the result distinguished by the distinguish means 33.

Next, the special functions will be described in more detail.

Muting Function;

A muting function requires a muting input from an external device such as an optical sensor to be initiated, and is a function for outputting a safety control output representing operation allowable temporarily regardless of the result of a distinguish by the distinguish means 33 (shown in FIG. 1). A shifting from the normal operating status to a status in the muting function is performed in only case where the distinguish means 33 determines that all of the light axes 10 are passed through.

Override Function;

An override function requires a muting input from an external device such as an optical sensor and an override input to be initiated, and is a function for outputting a safety control output representing operation allowable temporarily regardless of the result of a distinguish by the distinguish means 33. A shifting from the normal operating status to a status in the override function is performed in the case where the distinguish means 33 determines that at least one of any light axes 10 is intercepted.

The override function is suitable for an embodiment described hereinafter.

In the case where an object is transported into a hazardous area utilized by a conveyer, a light curtain is set up at an entrance of the hazardous area. In this case, muting sensors are set up at the forward and backward locations of the light curtain (the entrance opening) along the transporting direction by the conveyer. During the transported object is detected by the muting sensor, an operation allowable signal is maintained and outputted from the multi-optical axis photoelectric sensor 1 to the conveyer and, for example, to a process robot in the hazardous area under the muting function even if the transported object passes (intercepts) the light curtain. In this case, the conveyer and the process robot are connected to the safety control output of the multi-optical axis photoelectric sensor 1.

In the case where an unexpected accident such as a time out of the muting function, a momentary break of power supply or various errors occur when the muting function is activated and the transported object intercepts the light curtain, it is difficult to return to the former status. In more detail, in such case, since the multi-optical axis photoelectric sensor 1 is reset on the status that the light axis is intercepted by the transported object, the muting function can not be activated even though the muting input is received. In other words, the requirement of shifting to the muting function is that all of the light axes are passed through. However, at the time of restart, the requirement is not met because the transported object blocks the light axis. Therefore, the shifting from the normal status to the muting function is not performed. Since the safety control output is connected to the conveyer, the transported object intercepting the light axis can not be moved via the conveyer from the detection area of the multi-optical axis photoelectric sensor 1. Further, when the object intercepting the light axis is heavy, the status that the light axis is blocked is maintained since the object can not be moved away.

The override function is suitable for in the above mentioned case. Thus, a requirement for shifting to the override function is that the muting input is received, at least one of any light axes is blocked, and an override input is received from an external device.

Interlock Function;

When an interlock function is activated, when at least one of any light axes is blocked, a shifting to an operating allowable status (one kind of the normal operating status) is not performed until a reset input is received even though all of the light axes begin to be passed through. The situation is defined as under a interlock status. A situation where all of the light axes are passed through under the interlock, is defined as a reset enable status. In the reset enable status, the multi-optical axis photoelectric sensor 1 is capable to shift to the operating allowable status in response to receiving the reset input. On the other hand, a situation where a part of or all of any light axes are blocked under the interlock, is defined as a reset disable status. In the reset disable status, the multi-optical axis photoelectric sensor 1 is not allowed to shift to the operating allowable status even if the reset input is received.

Shifting of the Operating Status;

The above operating status is set by an setting output from the non-safety control device 4. The controller 5 determines whether the multi-optical axis photoelectric sensor 1 is capable of shifting to the designated operating status or not in response to the setting output from the non-safety control device 4. For example, the operating status indicating means 53 does not indicate an operating status until the operating status is specified (confirmed) as the result of the determination in the power on stage. In such the case, alternatively, the operating status indicating means 53 may indicate the unstable condition of the operating status to the non-safety control device 4.

On the other hand, in the case where the operating status is shifted according to the setting output from the non-safety control device 4, the operating status indicating means 53 does not indicate the operating status to the non-safety control device 4 until confirmation of the operating status is shifted. In this case, alternatively, the operating status indicating means 53 may indicate the unstable condition of the operating status to the non-safety control device.

In the case where the shifting of the operating status is performed, the operating status indicating means 53 indicates the new shifted operating status to the non-safety control device 4. The operating status indicating means 53 distinguishes and indicates in accordance with a program of the new operating status.

Safety Control Output:

The control unit 50 outputs the distinguish result from the distinguish means 33 shown in FIG. 1 to the safety control device 9 under the normal operating status. When the distinguish result of the distinguish means 33 shown in FIG. 1 is that all of the light axes are passed through, the control unit 50 outputs the safety control output representing the operation allowable to the safety control device 9. On the other hand, when the distinguish means determines that at least one of any light axes is intercepted, the control unit 50 outputs the safety control output representing the operation non-allowable to the safety control device 9.

In an abnormal condition such that a fault occurs in a circuit of the multi-optical axis photoelectric sensor 1 detected by the detection means 34A to 34c and an alignment of the light axis becomes improper, the control unit 50 outputs the safety control output representing the operation non-allowable to the safety control device 9.

In a special operating status of the multi-optical axis photoelectric sensor 1, the control unit 50 outputs the safety control output representing the operating allowable to the safety control device 9 regardless of the distinguish result of the distinguish means 33.

In the above mentioned, the control unit 50 outputs the safety control output to the safety control device 9. Simultaneously, the operating status indicating means 53 outputs (indicates) the shifting of the operating status of the multi-optical axis photoelectric sensor 1 via the output line including individual lines ST1, ST2 to the non-safety control device 4. The non-safety control device 4 can take the current operating status in. Therefore, a device which is free from the safety regulations, can perform with the various kinds of controls.

Communication Method of Operating Status:

The controller 5 and the non-safety control device 4 are connected to each other via the output lines SR1, ST2 not shown. The output lines include a plurality of output lines. The operating status indicating means 53 provides a pulse signal representing the operating status via the output line ST2. The number of pulse signals is in accordance with the operating status. On the other hand, a timing signal for indicating whether the pulse signal through the individual output line ST1 is valid or not is provided via the individual output line ST1.

Figure 2B:
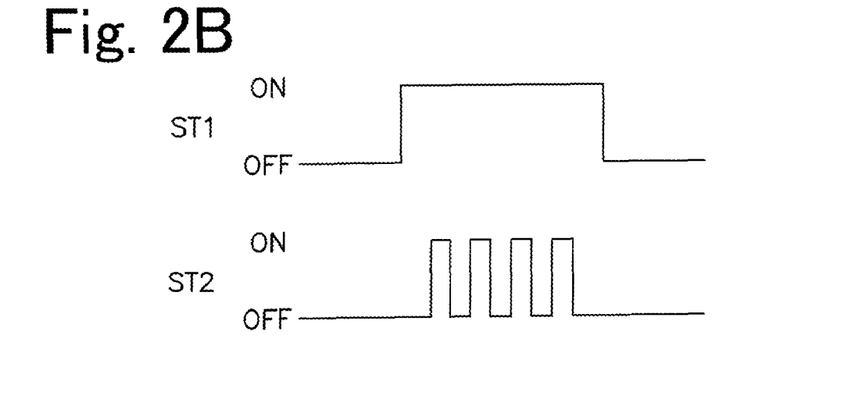
FIG. 2B is a diagram showing a pulse signal from a controller to a non-safety device.

That is, the controller 5, for example, as shown in FIG. 2B, prepares the number of ON state pulse of the second pulse signal ST2 corresponding to the operating status, and can indicate the various kinds of operating status based on the prepared pulse number of the second pulse signal ST2 when the first pulse signal ST1 is ON state. For example, in the case where the normal operating status, abnormal status, muting status, override status and interlock status are indicated by the second pulse signal ST2, the number of the pulse is set to '1', '2', '3', '4' and '5' for each. Consequently, since the same output line including the individual lines ST1, ST2 are suitable to provide three or more kinds of operating status, that is, the number of output lines is lower than the number of the indictable operating statuses, the increasing of the number of output lines is reduced. Moreover, it is preferred that the abnormal status is divided in more detail. The number ('6', '7', . . . 'N') of the pulse of the second pulse signal ST2 may be prepared in accordance with the reason of the abnormal instead of the abnormal status '2'.

Further, it is preferred to be capable of selecting an output definition from three states representing each inclusive status or ramified state representing each ramified and concrete status.

For example, in ramification, in the case of the normal operating status, a two-state output may be provided to discriminate between the operation allowable status corresponding to all of the light axes being passed through and the operation non-allowable status corresponding to where a part of or all of the light axes are blocked.

In the case of the special operating status, a three-state output may be provided to discriminate between the muting status, the override status and the interlock status.

In the case of the abnormal status, a two-state output may be provided to discriminate between the reset non-allowable status where the reset input is not permitted and the reset allowable status where reset input is permitted. Moreover, in the case of the reset non-allowable status, a plurality of status outputs may be provided to discriminate between output error, emitting error, receiving error, communicating error, muting error, interlock error and configuration error.

Further, it is preferred that the inclusive status output and the ramified status output are mixed. For example, the normal operating status output, the muting status output and the override status output may be provided.

It is preferred that the ramified status output such as the reset allowable status and the reset non-allowable status is provided instead of providing the interlock status. Alternatively, in the case of interlock status, the reset allowable status output may be provided via another output terminal IR.

It is preferred that the operating status is provided by way of the combination of ON/OFF signals, binary code (combination of the binary code), via a plurality of output lines instead of the pulse signal.

Preferred embodiment of the processing machine with press machine 91.

A process system will be explained in the case where the multi-optical axis photoelectric sensor 1 is applied to the press machine 91 as an application example of the multi-optical axis photoelectric sensor 1 shown in FIG. 2A. The safety control device 9 is connected to the press machine 91 and the like. The non-safety control device 4 is connected to an apparatus relating to process quality and process accuracy of products such as a pressure sensor 44 etc. equipped in the press machine 91, and is also connected to a mechanical lock 41 for fixing the movement of the press machine 91 mechanically. The non-safety control device 4 includes a timer (not shown in drawings) for measuring time on the muting state.

Operation of Press System:

Referring to the flowchart in FIG. 3, the operation of the system will be described.

Confirming Normal Initiation;

At a timing T1, an operator turns on the system. When the system is initiated, a safety light curtain is formed between an emitting unit 2 and a receiving unit 3 corresponding to the emitting unit 2. The light curtain includes a plurality of light beams from a plurality of emitting elements of the emitting unit 2 through a plurality of receiving elements of the receiving unit 3. An all-passing signal generated by the distinguish means 33 is provided to a controller 5. On the other hand, detection means 34A to 34C performs a self-check to detect whether the multi-optical axis photoelectric sensor 1 is in an abnormal status or not.

A operating status indicating means 53 of the controller 5 provides a signal representing the normal operation status to the non-safety control device 4 in response to a confirmation that the multi-optical axis photoelectric sensor 1 is not in the abnormal status and the all-passing signal is received from the distinguish means 33, namely confirmation of the normal initiation.

After turning on, the operating status indicating means 53 does not indicate the operating status to the non-safety control device 4 until the operating status is confirmed and specified.

Normal Operating Status:

During the Normal Operating Status;

During normal operating, the control unit 50 of the controller 5 shown in FIG. 2, an output according to pass/block signal which is the result of a determination by the distinguish means 33 (shown in FIG. 1) is provided to an output.

In other words, when the all-passing signal is provided from the distinguish means 33 (shown in FIG. 1) to the controller 5 on the normal operating status, the control unit 50 provides the safety control signal representing operation allowable (ON) to the safety control device 9.

On the other hand, during the normal operating status, when at least a part of the light beam is blocked by a part of a person body, the controller 5 provides the safety control signal representing operation non-allowable (OFF) to the safety control device 9. At the time, the status of the controller 5 is shifted from the normal operating status to an interlock status described below. The safety control device 9 stops the press machine 91 immediately in response to receiving the safety control signal representing an operation non-allowable. A restarting of the press machine 91 will be described as follows.

Muting Input;

At timing T2, when an optical sensor detects an object (processed material), a detection signal as a muting signal is provided (Muting input) from the optical sensor to the controller 5. In more detail, for example, when the object is transported to the press machine 91 by way of a belt conveyer and the like and the light curtain is disposed on and crossed over the belt conveyer, a pair of optical sensors are disposed adjacent to the light curtain and at each of the upward end and the downward end of the light curtain along the flow direction of the belt conveyer. When the optical sensor at the upward end detects a front end of the object, the optical sensor provides the muting signal to the controller 5.

Confirming the Muting Status;

After the timing T2, when the controller 5 receives the muting signal and receives the all-passing signal from the distinguish means 33, the status of the multi-optical axis photoelectric sensor 1 is shifted from the normal operating status to the muting status at timing T3. On the other hand, the operation status indicating means 53 provides a signal representing the muting status to the non-safety control device 4 via the output lines ST1, ST2. During the muting status, the control unit 50 provides the safety control signal representing an operation allowable to the safety control device 9 regardless of the passing through/block signal from the distinguish means 33.

Deactivating Muting Status;

At timing T4, when the optical sensor at the downward end finishes detecting the rear end of the object, the muting signal is not provided. The controller 5 recognizes the disconnection of providing the muting signal as the muting deactivating signal.

Confirming End of Muting->Normal Operating Status;

At timing T5, when the controller 5 recognizes that the multi-optical axis photoelectric sensor 1 is not in an abnormal status and receives the all-passing signal from the distinguish means 33, the muting status is deactivated and is shifted to the normal operating status. On the other hand, operation status indicating means 53 provides a signal representing the normal operating status to the non-safety control device 4 via the output lines ST1, ST2.

Confirming Muting Input and Muting Status;

At timing T6, when the optical sensor at the upward end detects another object, the muting signal is provided to the controller 5. At timing T7, the status of the controller 5 is shifted to the muting status and the controller 5 confirms the status.

Confirming Initiation (in Case of Auto Reset);

When a momentary breaking of the power supply occurs, the muting status is canceled and the control unit 50 provides the safety control signal representing operation non-allowable to the safety control device 9. Consequently, the safety control device 9 stops the press machine 91. At timing T8, a confirmation of normal initiation is automatically performed. If the initiation is confirmed as normal, the multi-optical axis photoelectric sensor 1 operates the normal status (Auto reset).

At that time after the momentary breaking of the power supply on the muting status, when the object at the light curtain intercepts at least one of any light beams of the multi-optical axis photoelectric sensor 1, the object remains at the light curtain since the conveyer stops in view of the safety control signal representing operation non-allowable. Moreover, at least one of any light beams is intercepted, the status is not shifted to the muting status although the muting signal is provided. Therefore, the object has to be removed from the light curtain. At timing T9, an override signal is provided via an input terminal 9 shown in FIG. 2A, and the status of the controller 5 is shifted to an override status. On the other hand, the operating status indicating means 53 provides a signal representing the override status to the non-safety control device 4 via the output lines ST1, ST2. On the override status, the controller 5 provides the safety control signal representing operation allowable regardless of the passed through/blocked signal from the distinguish means 33. Thus, the object on the conveyer can be removed from the light curtain. The requirement of shifting from the normal operating status to the override status is that the muting signal and the override signal are provided, and the block signal is provided from the distinguish means 33.

Figure 3:
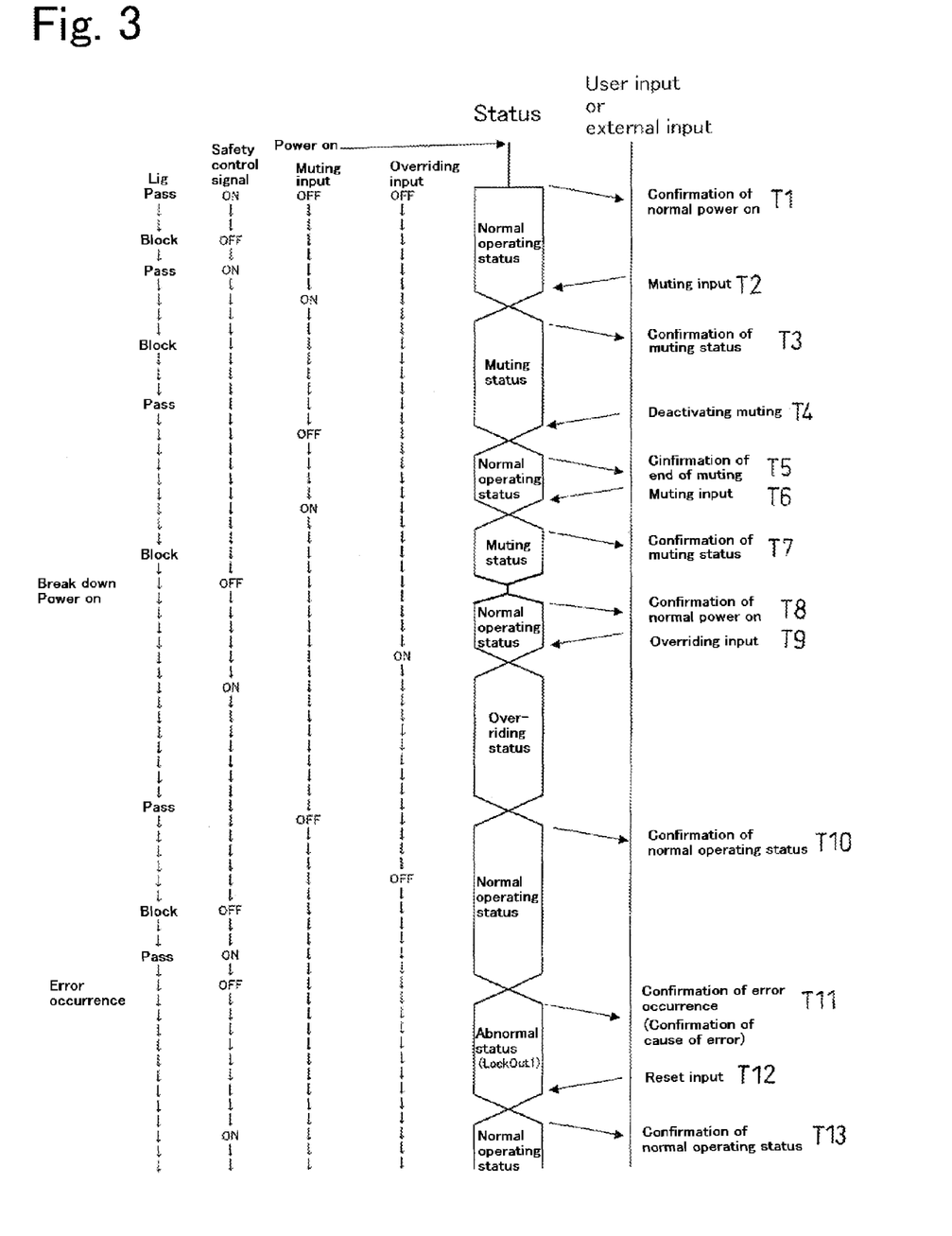
FIG. 3 is a timing chart showing an example of operation for a system with a multi-optical axis photoelectric sensor.

When the object intercepting the light beam is removed and the controller 5 receives the all-passing signal from the distinguish means 33, at timing T10, the status is shifted from the override status to the normal operating status as shown in FIG. 3. On the other hand, the operating status indicating means 53 provides a signal representing the normal operating status to the non-safety control device 4 via the output lines ST1, ST2.

The detection means 34A to 34C periodically repeat to self-check as the mentioned above from initiating of the system. At timing T11, when at least one of any detection means 34A to 34C detects the abnormal status, the control unit 50 provides the safety control signal representing an operation non-allowable to the safety control device 9 regardless of the passed through/blocked signal. The safety control device 9 stops the press machine 91 immediately in response to receiving the safety control signal representing operation non-allowable. On the other hand, the operating status indicating means 53 provides the abnormal status to the non-safety control device 4.

Reset Input;

When the operator solves a problem causing the abnormal status, at timing T12, the operator resets manually. After that, the multi-optical axis photoelectric sensor 1 operates on the normal operating status. On the other hand, the operating status indicating means 53 provides a signal representing shifting to the normal operating status to the non-safety control device 4. At timing T13, the non-safety control device 4 can confirm the shifting from the abnormal status to the normal operating status based on the signal from the operating status indicating means 53.

It is preferred that the operating status indicating means 53 determines whether the problem causing the abnormal status is solved or not, based on the detection signals from the detection means 34A-34C. As the result, if the problem is solved, a signal representing a reset acceptable status may be provided via the output lines ST1, ST2 or another terminal 61.

Figure 4:
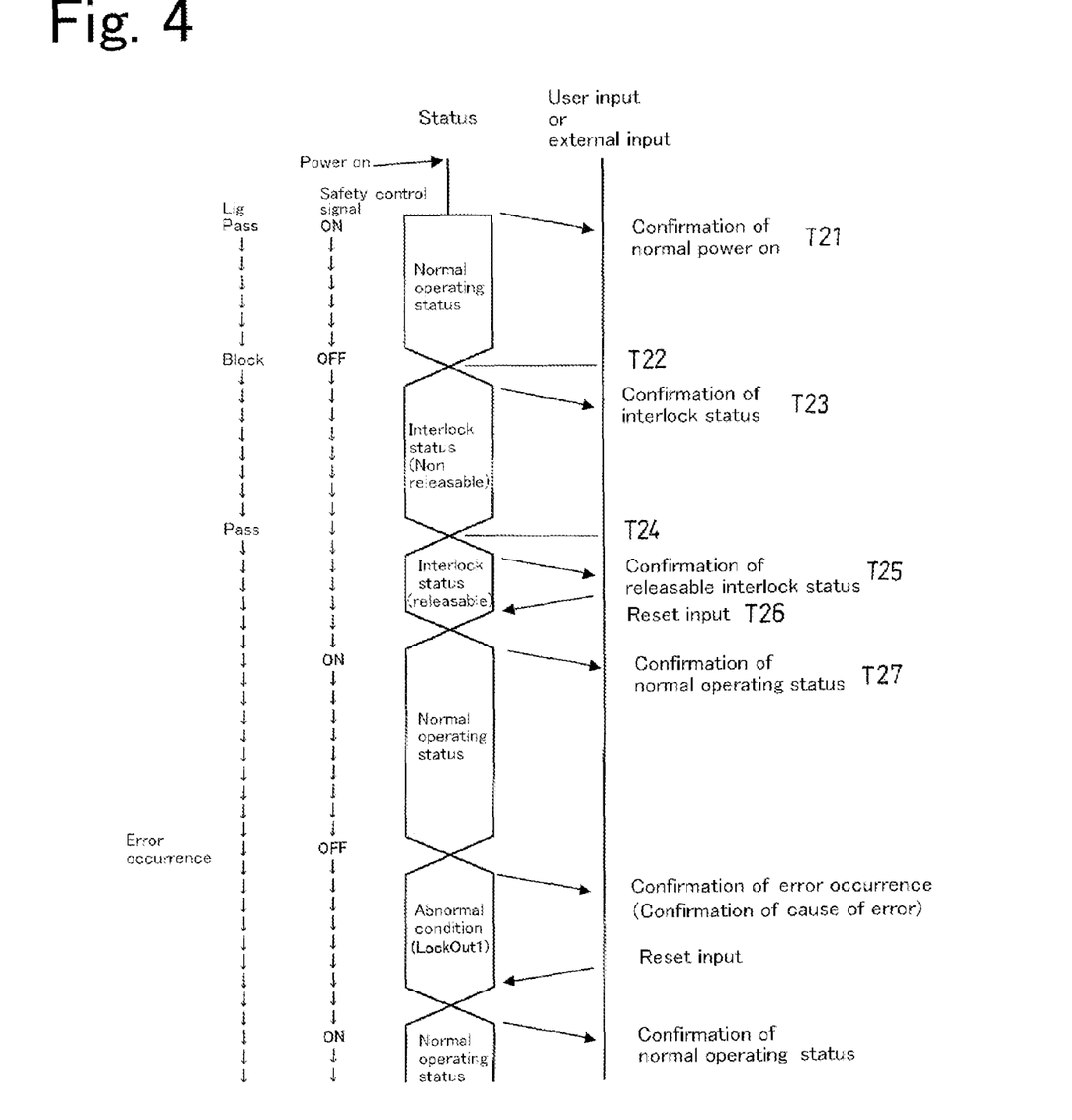
FIG. 4 is a timing chart showing another example of operation for a system with a multi-optical axis photoelectric sensor.

Other Operation Example:

Other examples of the movement of the system will be described based on a timing chart shown in FIG. 4.

When the system is turned on and the system is initiated on the normal operating status, a signal representing the normal operating status is provided to the non-safety control device 4. At timing T21, the non-safety control device can confirm a normal initiation of the multi-optical axis photoelectric sensor 1.

Interlock Status;

At timing T22, when at least a part of the light beams is blocked, the control unit 50 provides the safety control signal representing operation non-allowable to the safety control device 9. Then, the safety control device 9 stops the press machine 91 immediately in response to receiving the safety control signal from the control unit 50. The status is an interlock status.

The interlock status may be categorized as follows. If at least one of any light beams is blocked on the interlock status, the human body is understood to be at a hazardous source. In such a case, a reset input for releasing the interlock status should not be accepted. Therefore, one of the categorized interlock statuses is a non-releasable interlock status. On the other hand, in the case where all of the light beams are passed through on the interlock status, a reset input for releasing the interlock status is acceptable. Therefore, another of the ramified interlock status is a releasable interlock status.

At timing T22, when at least a part of the light beams is blocked, the operating status indicating means 53 provides a signal representing the non-releasable interlock status to the non-safety control device 4 via the output lines ST1, ST2.

At timing T23, the non-safety control device 4 confirms the non-releasable interlock status of the multi-optical axis photoelectric sensor 1 based on the signal from the operating status indicating means 53. If the multi-optical axis photoelectric sensor 1 receives a reset signal for releasing the interlock status, the reset signal is ignored on the non-releasable interlock status. Since the signal representing the non-releasable interlock status is essentially the same as a signal representing a status where at least one of any light beams is blocked, a common signal may represent both.

At timing T24, when the human body blocking the light beam moves and all of the light beams are passed through, the non-releasable interlock status is shifted to the releasable interlock status. At that time, the operating status indicating means 53 provide a signal representing the releasable interlock status to the non-safety control device 4 via the output lines ST1, ST2. As a result, at timing T25, the non-safety control device can confirm the releasable interlock status based on the signal from, the operating status indicating means 53. Of course, at that time, the detection means 34A to 34C do not detect any problems causing the abnormal status.

Manual Reset;

At timing T26 on the releasable interlock status, when an operator performs a predetermined reset operation, a reset input is provided to the control unit 50 shown in FIG. 2 via an input terminal 62. When the multi-optical axis photoelectric sensor 1 receives the reset input, the status of the multi-photoelectric sensor is shifted to the normal operating status. At that time, the operating status indicating means 53 provides a signal representing the normal operating status to the non-safety control device 4 via the output lines ST1, ST2. At timing T27, the non-safety control device 4 can confirm shifting to the normal operating status based on the signal from the operating status indicating means 53.

Figure 6:
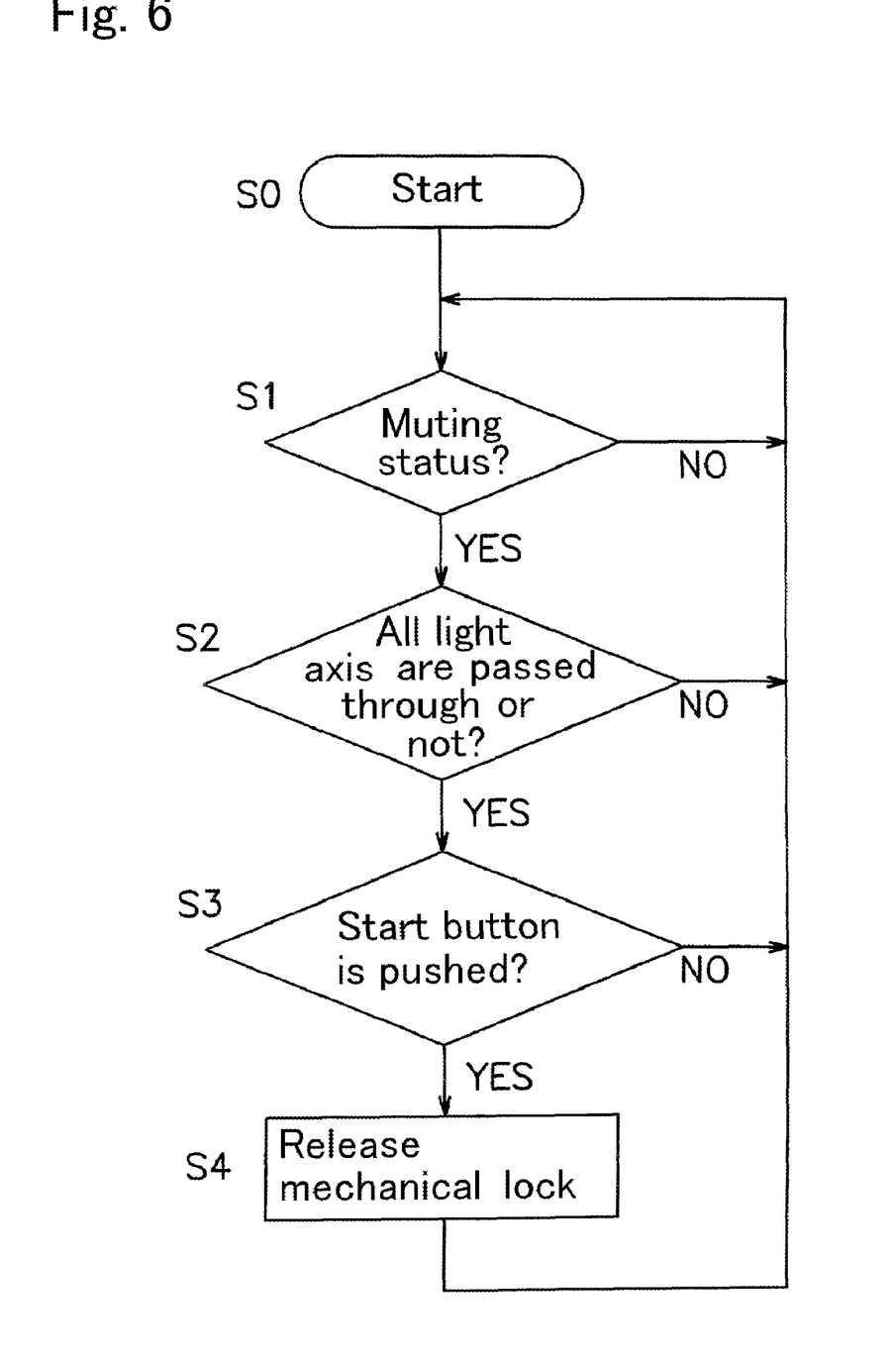
FIG. 6 is an example of a flowchart regarding a non-safety control device.
Figure 7:
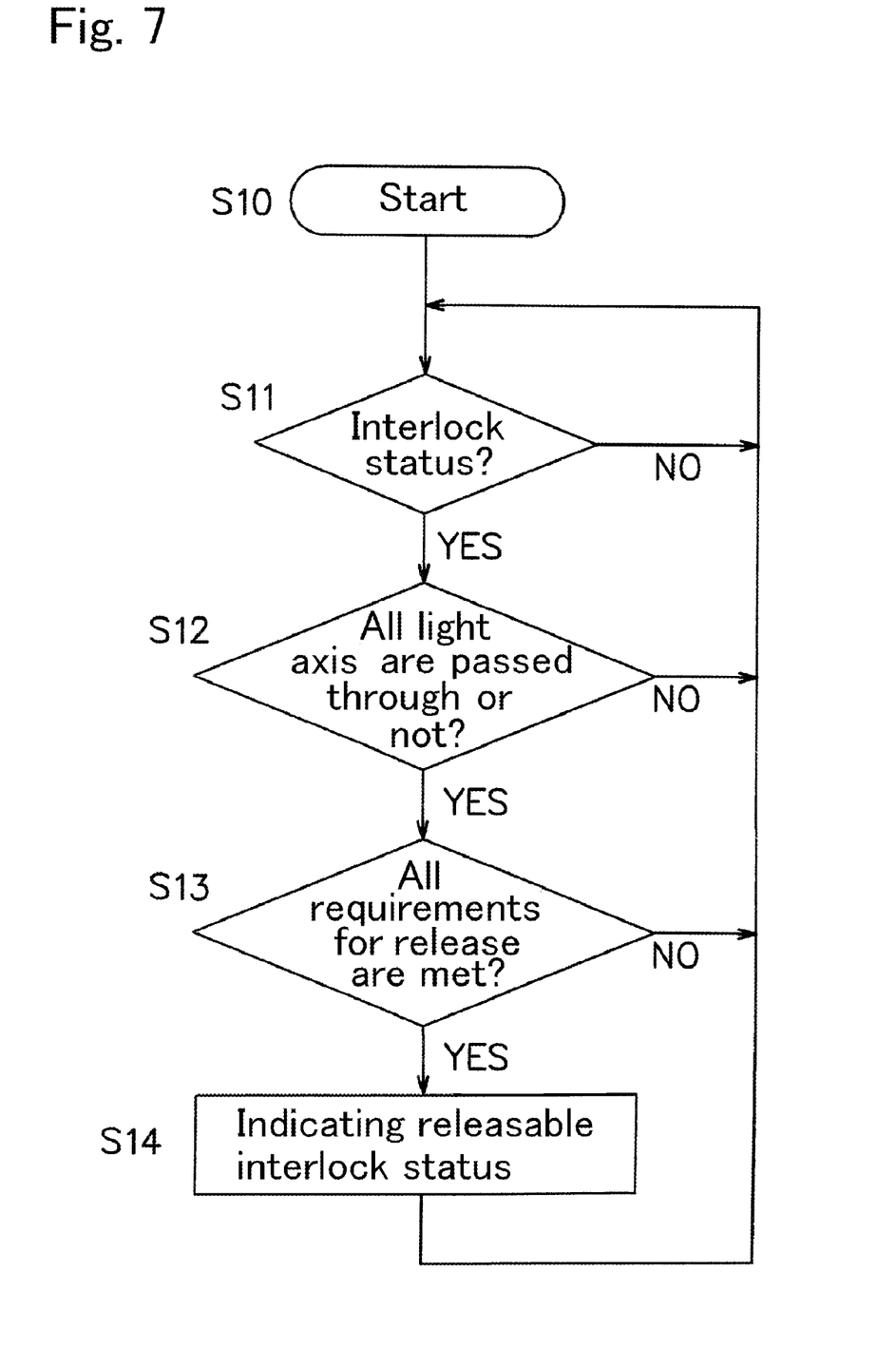
FIG. 7 is an example of a flowchart showing the resetting of an interlock regarding a safety control device.

An example of applications utilizing the multi-optical axis photoelectric sensor 1 is described as shown in FIGS. 5 to 7.

As the above-mentioned, an arm 102 shown in FIG. 5A rotates as shown in FIG. 5C. Then, the arm 102 transports an object W to a processing machine M. An operational panel 106 is connected to the controller 5, the non-safety control device 4 and the safety control device 9.

As shown in FIGS. 5B and 5C, above a rod 105, a thru-beam optical sensor 110 for detecting an upper end of the rod 105 is equipped. When a rotating unit 103 is fixed by the rod 105 as shown in FIG. 5B, the optical sensor 110 detects the top end of the rod 105. Thus, the status of the multi-optical axis photoelectric sensor 1 is shifted to the muting status. On the other hand, when the rod 105 shown in FIG. 5D goes down and the rotating unit 103 is not fixed, the optical sensor 110 does not detect the top end of the rod 105. Then, muting status is shifted.

A muting status in one of embodiments according to the present invention is described as referring to a flowchart shown in FIG. 6.

In step S0, an operator O instructs suspending to the arm 102 by using the operational panel 106.

In step S1, the rotating unit 103 rotates to a predetermined suspending position toward the processing machine M. After the rotating unit 103 is positioned at the predetermined suspending position, the rod 105 enters a hole of the rotating unit 103. The top of the rod 105 goes out from the opposite side of opening in the hole. Thus, the optical sensor 110 detects the top of the rod 105. The controller 5 receives the signal from the optical sensor 110 as the muting input. In this case, if all of the light beams of the multi-optical axis photoelectric sensor 1 are passed through, the status of the multi-optical axis photoelectric sensor 1 is shifted to the muting status. At the time, the operating status indicating means 53 provides a signal representing the muting status to the non-safety control device 4 via the output lines ST1, ST2. On the other hand, if the optical sensor 110 does not detect the rod 105, the status is not shifted to the muting status.

In step S2, a determination of whether all of the light beams of the multi-optical axis photoelectric sensor 1 are passed through or not is executed. If the result of the determination is Yes, the step proceeds to the next step, step S3. On the other hand, if the result of the determination is No, the step goes back to the step S1. Therefore, if the operator O does not go out from the detection area A completely and a start button 107 is pushed, the rod 105 still remains and intercepts the light beam of the optical sensor 105 since the pushing of the state button 107 is ignored. As that result, the arm 102 is fixed to provide a safe situation and preventing the stopping of the system needlessly are both achieved.

After that, when the operator goes apart from the detection area A, all of the light beams are passed through in the detection area A. At that time, an all-passing signal is provided from the controller 5 to the non-safety control device 4 via an output line C/R. Then, the step proceeds to the next step, step S3.

In step S3, when the operator O pushes the start button 107, the step proceeds to the next step, step S4. In other words, as shown in FIG. 5D, the rod goes down in accordance with a signal representing the start from the start button 107. After that, since the optical sensor 110 does not detect the rod 105, the muting status is shifted to the normal operating status.

Another embodiment according to the present invention will be described as follows. In this embodiment, it is capable to indicate whether an interlock is releasable or not, on an operational panel and the like. The method will be described as referring to the flowchart shown in FIG. 7.

The operational panel includes a display means, for example, composed of a Liquid Crystal Display (LCD).

In step S10, when at least one of any light beams of the multi-optical axis photoelectric sensor 1 is intercepted on the normal operating status, the control unit 50 provides the safety control signal representing operation non-allowable to the press machine as the hazardous source. The press machine is stopped in response to the safety control signal. The status of the multi-optical axis photoelectric sensor 1 is shifted to interlock status.

In Step S11, a determination whether of the status is on the interlock status or not is made. If the determination is Yes, the step proceeds to step S12.

In step S12, the distinguish means 33 detects the condition of passing or blocking light. The self-checking is performed by the detection means 34A to 34C. In other words, when an operator is not present in the detection area and the multi-optical axis photoelectric sensor 1 does not have a fault, the step proceeds to step S13.

In step S13, when other requirements for starting are met, for example, a detection pressure measured by a pressure sensor is within a predetermined range, the step proceeds to step S14.

In step S14, information representing that an interlock is releasable is indicated on the display means. The information allows an operator to know the proper timing for pushing the button for releasing the interlock.

It is preferred that the same signals can be provided via the terminals 61, 62 for backup and verification.

Figure 8:
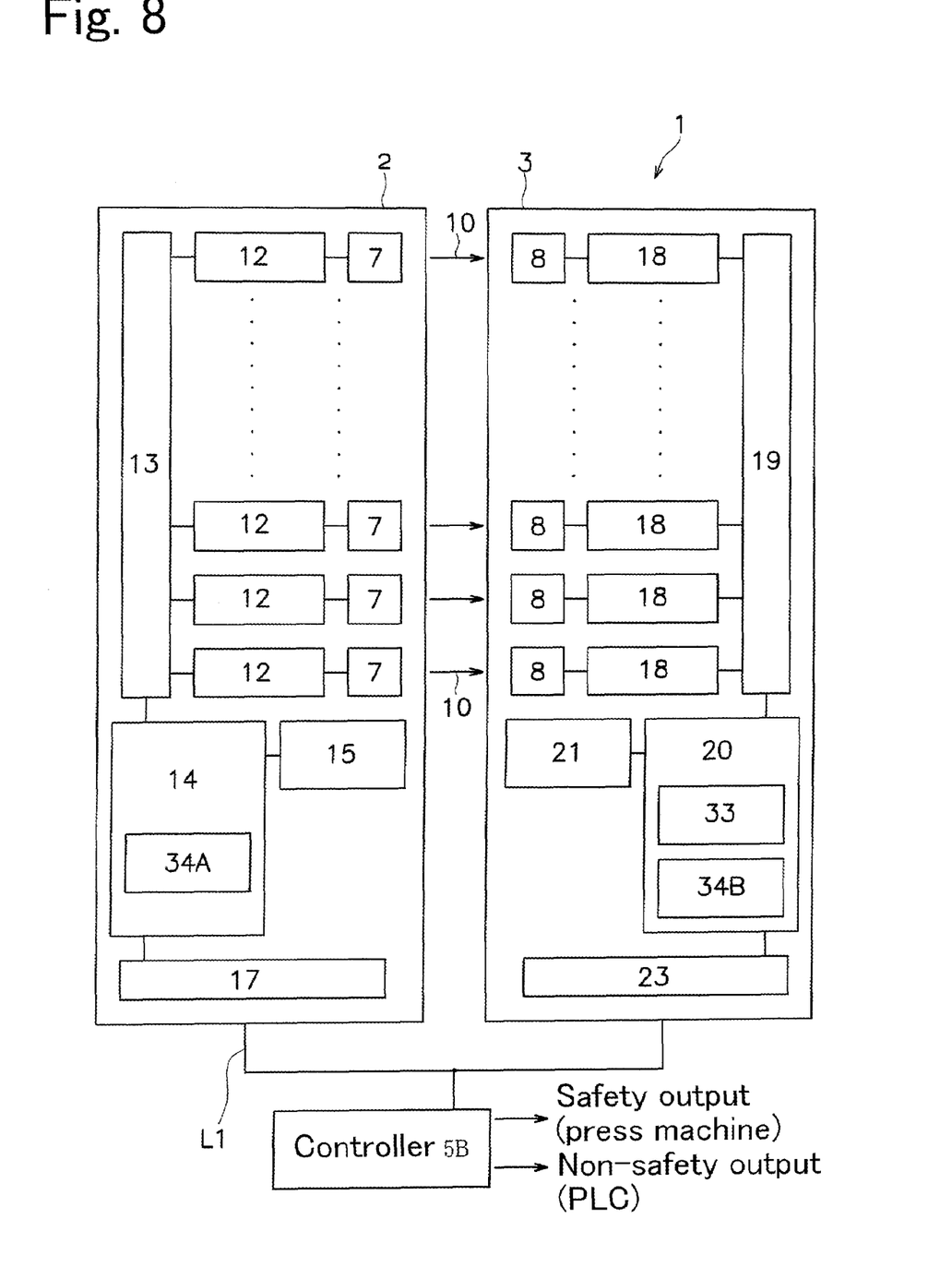
FIG. 8 is a schematic block diagram showing a multi-optical axis photoelectric sensor according to the first embodiment.

In the above-mentioned embodiments, the controller 5 is installed in the receiving unit 3. However, according to the present invention, the position of the controller 5 is not limited. For example, as shown in FIG. 8, the controller 5B corresponding to the controller 5 may be separate from the emitting unit 2 and the receiving unit 3. Or, the controller 5B is installed in the emitting unit 2.

The present invention is applicable for a multi-optical axis photoelectric sensor which forms a light curtain for detecting a human body and the like penetrating into a predetermined area.

What is claimed is:

1. A multi-optical axis photoelectric sensor including a plurality of light axes to provide a safety control signal corresponding to light pass/block status of the plurality of light axes, comprising:
    a distinguish portion for distinguishing whether all of the plurality of light axes are passed through or at least one of the plurality of light axes is blocked;
    a detector to detect an abnormal condition of the multi optical axis photoelectric sensor;
    a control unit to control the safety control signal based on the result distinguished by the distinguish portion and the result detected by the detector, wherein the control unit sets the safety control signal representing the result distinguished by the distinguish portion on a normal operating status, the control unit sets the safety control signal representing at least one of the plurality of light axes is blocked regardless of the result distinguished by the distinguish portion on an abnormal status detected by the detector, and the control unit sets the safety control signal representing all of the plurality of light axes are passed through regardless of the result distinguished by the distinguish portion on a special operating status;
    an operating status indicating portion for confirming an operating status of the multi-optical axis photoelectric sensor from the normal operating status, the abnormal status and the special operating status and for providing a signal representing the confirmed operating status of the multi-optical axis photoelectric sensor to an external device via the same output line regardless of the determined operating status; and
    wherein the operating status indicating portion provides the signal to the external device via the same output line in response to confirming of shifting of the operating status.

2. The multi-optical axis photoelectric sensor according to claim 1, wherein the same output line includes a plurality of individual lines, and the operating status indicating portion provides a first signal having a number of pulses corresponding to the operating status via one of the plurality of individual lines and a second signal representing whether the first signal is enabled or not via another of the plurality of individual lines.

3. The multi-optical axis photoelectric sensor according to claim 1, wherein the same output line includes a plurality of individual lines, and the operating status indicating portion provides binary code made by a combination of a plurality of ON/OFF state signals via each of the plurality of individual lines.

4. The multi-optical axis photoelectric sensor according to claim 1, wherein the control unit controls to shift the multi-optical axis photoelectric sensor to a muting status as the special operating status based on receiving a muting input.

5. The multi-optical axis photoelectric sensor according to claim 4, wherein the control unit controls to shift the multi-optical axis photoelectric sensor to an override status as the special operating status based on receiving a muting input and an override input.

6. The multi-optical axis photoelectric sensor according to claim 4, wherein the control unit controls to shift the multi-optical axis photoelectric sensor to an override status as the special operating status based on receiving a muting input and an override input where the distinguish portion distinguishes that at least one of the plurality of light axes is blocked.

7. The multi-optical axis photoelectric sensor according to claim 1, wherein the control unit controls to shift the multi-optical axis photoelectric sensor to a muting status as the special operating status based on receiving a muting input where the distinguish portion distinguishes that all of the plurality of light axes are passed through.

8. The multi-optical axis photoelectric sensor according to claim 1, wherein the operating status indicating portion does not indicate the operating status of the multi-optical axis photoelectric sensor or indicates unidentified operating status until verification of shifting the operating status at a power on period.

9. The multi-optical axis photoelectric sensor according to claim 1, wherein the operating status indicating portion does not indicate the operating status of the multi-optical axis photoelectric sensor or indicates unidentified operating status until verification of shifting the operating status at shifting period.

10. A multi-optical axis photoelectric sensor including a plurality of light axes to provide a safety control signal corresponding to light pass/block status of the plurality of light axes, comprising:

a distinguish means for distinguishing whether all of the plurality of light axes are passed through or at least one of the plurality of light axes is blocked;

a detection means for detecting an abnormal condition of the multi-optical axis photoelectric sensor;

a control means for controlling the safety control signal based on the result distinguished by the distinguish means and the result detected by the detection means, wherein the control means sets the safety control signal representing the result distinguished by the distinguish means on a normal operating status, the control means sets the safety control signal representing at least one of the plurality of light axes is blocked regardless of the result distinguished by the distinguish means on an abnormal status detected by the detection means, and the control means sets the safety control signal representing all of the plurality of light axes are passed through regardless of the result distinguished by the distinguish means on a special operating status;

an operating status indicating portion for confirming an operating status of the multi-optical axis photoelectric sensor from the normal operating status, the abnormal status and the special operating status and for providing a signal representing the confirmed operating status of the multi-optical axis photoelectric sensor to an external device via the same output line regardless of the determined operating status; and wherein the operating status indicating portion provides the signal to the external device via the same output line in response to confirming of shifting of the operating status.

* * * * *